US009723939B2

(12) United States Patent
Wharton

(10) Patent No.: US 9,723,939 B2
(45) Date of Patent: *Aug. 8, 2017

(54) VALVE FOR A SIPPY CUP AND SIPPY CUP INCLUDING THE SAME

(71) Applicant: Tervis Tumbler Company, North Venice, FL (US)

(72) Inventor: Steve Wharton, North Port, FL (US)

(73) Assignee: Tervis Tumbler Company, North Venice, FL (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/848,858

(22) Filed: Sep. 9, 2015

(65) Prior Publication Data
US 2015/0374154 A1 Dec. 31, 2015

Related U.S. Application Data

(63) Continuation of application No. 13/793,032, filed on Mar. 11, 2013, now Pat. No. 9,151,398.

(51) Int. Cl.
*A47G 19/22* (2006.01)
*F16K 15/14* (2006.01)

(52) U.S. Cl.
CPC .......... *A47G 19/2272* (2013.01); *F16K 15/14* (2013.01); *F16K 15/147* (2013.01)

(58) Field of Classification Search
CPC .... F16K 15/14; F16K 15/147; A47G 19/2272
USPC ...... 220/714, 203.19, 212.5, 203.01, 203.11; 215/11.4, 11.5
See application file for complete search history.

(56) References Cited

U.S. PATENT DOCUMENTS

| | | | |
|---|---|---|---|
| 5,542,670 | A | 8/1996 | Morano |
| 5,706,973 | A | 1/1998 | Robbins, III et al. |
| 6,050,445 | A | 4/2000 | Manganiello |
| 6,321,931 | B1 | 11/2001 | Hakim et al. |
| 6,607,092 | B2 | 8/2003 | Manganiello et al. |
| 8,403,164 | B2 | 3/2013 | Samson |

(Continued)

FOREIGN PATENT DOCUMENTS

DE 296 17 013 1/1997

OTHER PUBLICATIONS

International Search Report for PCT/US2014/020654 mailed on Oct. 30, 2014.

(Continued)

*Primary Examiner* — Fenn C Mathew
*Assistant Examiner* — Don M Anderson
(74) *Attorney, Agent, or Firm* — Caesar Rivise, PC

(57) ABSTRACT

A replaceable valve member for a sippy cup assembly is disclosed. The valve member is a flexible, resilient member for releasable mounting in the lid of the sippy cup. It includes a normally closed, but openable slit located within the sippy cup's spout when the valve member is in its operative position. The valve member includes another normally closed, but openable slit located at a vent in the sippy cup's lid when the valve member is in the operative position. The two slits open when suction is applied to the spout to enable liquid to be withdrawn through the spout. A recess is provided in a portion of the periphery of the valve member to preclude the trapping of residual liquid in the sippy cup. The valve member also includes an opening for releasably mounting it on a handle of the sippy cup in a storage position.

14 Claims, 3 Drawing Sheets

(56) References Cited

U.S. PATENT DOCUMENTS

| | | |
|---|---|---|
| 2003/0209555 A1 | 11/2003 | Belcastro |
| 2005/0098567 A1* | 5/2005 | Randolph .......... A47G 19/2272 220/710.5 |
| 2005/0205589 A1* | 9/2005 | Davis .................... F16K 15/142 220/714 |
| 2006/0151499 A1 | 7/2006 | Lieberman et al. |
| 2006/0169694 A1 | 8/2006 | Kemper |
| 2008/0073363 A1 | 3/2008 | Higgins |
| 2010/0147862 A1* | 6/2010 | Keefe ................ A47G 19/2272 220/714 |
| 2011/0079601 A1* | 4/2011 | Steininger .......... A47G 19/2272 220/714 |
| 2012/0037651 A1 | 2/2012 | Steuer |
| 2014/0076907 A1 | 3/2014 | Hammi |

OTHER PUBLICATIONS

Communication Relating to the Results of the Partial International Search attached to Invitation to Pay Additional Fees for PCT/US2014/020654 mailed Aug. 14, 2014.

\* cited by examiner

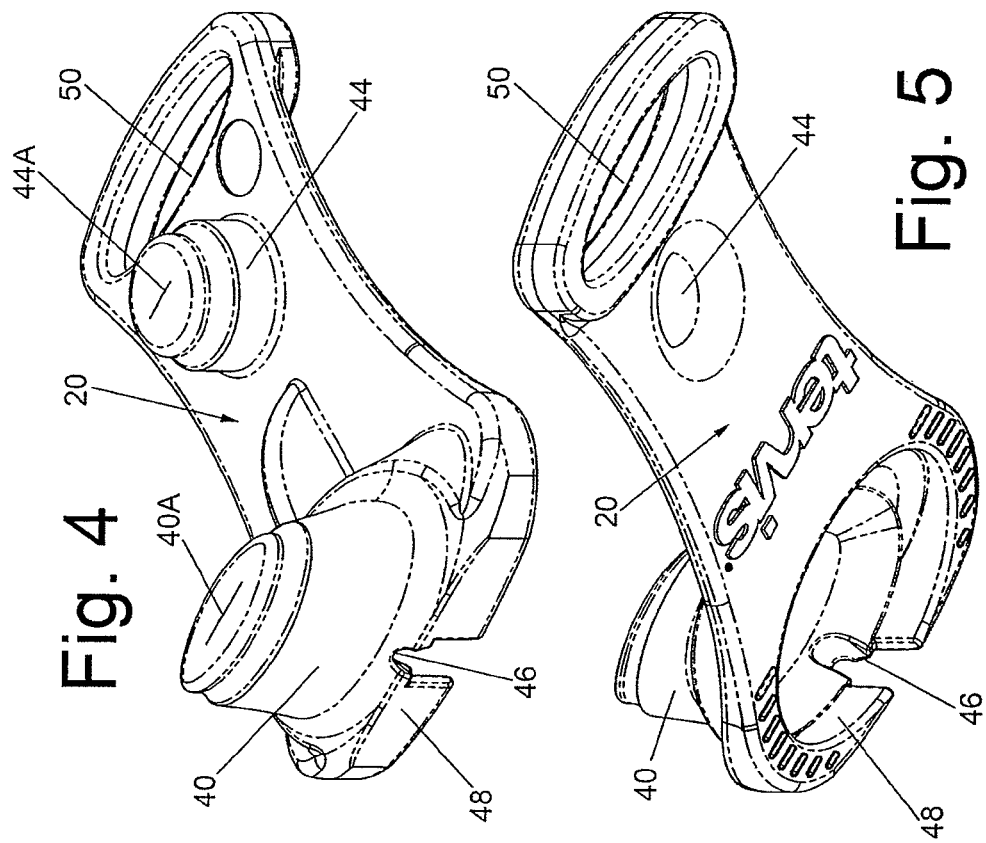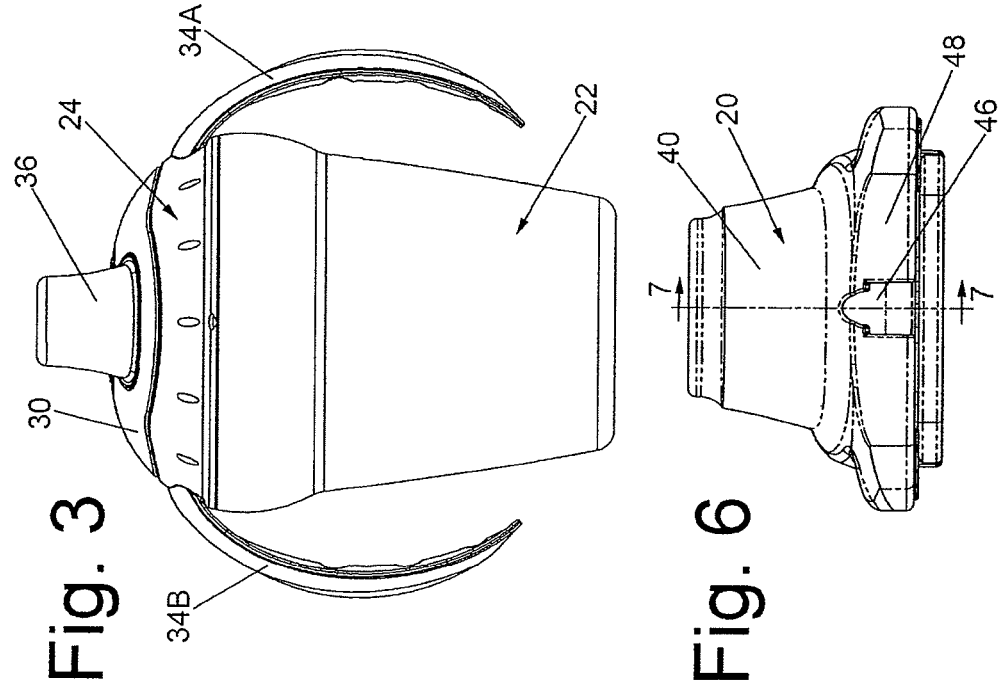

VALVE FOR A SIPPY CUP AND SIPPY CUP INCLUDING THE SAME

CROSS-REFERENCE TO RELATED APPLICATIONS

This application is a continuation of U.S. application Ser. No. 13/793,032, filed on Mar. 11, 2013 entitled Valve For A Sippy Cup. The entire disclosure of the foregoing application is incorporated by reference herein.

FIELD OF THE INVENTION

This invention relates generally to sippy cups and more particularly to valves for use therein.

BACKGROUND OF THE INVENTION

So called "sippy cups", such as used by infants and toddlers and other persons having difficulty drinking from a conventional cup or glass, commonly make use of a valve located within the lid of the sippy cup. The valve is located at or adjacent the spout and serves to prevent liquid egress therethrough except when the user of the sippy cup sucks on the spout to withdraw the liquid. Thus, such valves serve to keep the liquid contents isolated from the ambient surroundings, while also preventing spillage or leakage through the spout. Some sippy cups make use of valves which are permanently secured to the lid and thus form a non-removable portion of the sippy cup. While that arrangement reduces the risk of loss of the valve, it suffers the drawback of rendering the sippy cup difficult to effectively sanitize completely, e.g., mold and bacteria may build up in portions of the sippy cup assembly which are difficult if not impossible for cleansing liquids to reach when the sippy cup is washed in a dishwasher. To overcome that drawback various sippy cups make use of a removable unitary valve that is constructed of a resilient and flexible material, e.g., silicone rubber or a thermoplastic elastomer. That valve is typically releasably mounted within a hollow interior portion of the sippy cup lid. The thickness of the valve effectively creates a dam around its periphery in which a portion of the liquid contained within the sippy cup will be trapped if the sippy cup is completely inverted vertically when the user drinks from it. This dam effect thus prevents all of the liquid held within the sippy cup from being drunk. Obviously, this is less than desirable. Another drawback with prior art removable valves for sippy cups results from the fact that the valve may become lost or misplaced. In this regard, sippy cups making use of removable valves are typically cleaned by disassembling all of the components, e.g., the lid or cap is removed from the cup and then the valve is removed from the lid or cap, whereupon the disassembled components can then be placed in a dishwasher to wash and sanitize them all. Given that many repeated washings, and hence many repeated disassembles of the sippy cup components, are likely to be accomplished over the life of the sippy cup at some point the valve assembly may become lost or misplaced.

Accordingly a need exists for a removable sippy cup valve which overcomes the disadvantages of prior art removable sippy cup valves. The valve of this invention addresses that need.

SUMMARY OF THE INVENTION

In accordance with one aspect of this invention a replaceable valve member for a sippy cup assembly is provided. The sippy cup assembly includes a cup for holding a liquid and a lid releasably secured to the cup. The lid includes a hollow spout and an air vent. The sippy cup assembly also includes at least one handle for manually supporting the cup to enable a person to suck on the spout to withdraw the liquid from the cup through the spout. The replaceable valve member is a unitary member formed of a resilient, flexible material. It comprises a first projection, a second projection and an opening. The first projection includes a first, normally closed but openable valve element. The first projection is arranged to be releasably mounted within the spout when the replaceable valve member is in an operative position. The second projection of the replaceable valve member includes a second, normally closed but openable valve element. The second projection is arranged to be releasably mounted in the lid, with the second valve element in communication with the vent when the replaceable valve member is in the operative position. The second valve element is arranged to open upon negative pressure applied to the spout by the person sucking on the spout, whereupon liquid within the cup flows through the first valve element and the spout, while the second valve element opens to enable air to enter into the sippy cup through the vent. The opening in the valve element is configured to receive a portion of the at least one handle therein and to frictionally engage that portion of the handle to releasably secure the replaceable valve member on the at least one handle when the replaceable valve member is removed from the operative position and placed in a storage position.

In accordance with another aspect of this invention a replaceable valve member for a sippy cup assembly is provided. The sippy cup assembly includes a cup for holding a liquid and a lid releasably secured to the cup. The lid includes a hollow spout and an air vent. The sippy cup assembly also includes at least one handle for manually supporting the cup to enable a person to suck on the spout to withdraw the liquid from the cup through the spout. The replaceable valve member is a unitary member formed of a resilient, flexible material. It comprises a first projection, a second projection and a recess. The first projection includes a first, normally closed but openable valve element. The first projection is arranged to be releasably mounted within the spout when the replaceable valve member is in an operative position. The second projection of the replaceable valve member includes a second, normally closed but openable valve element. The second projection is arranged to be releasably mounted in the lid with the second valve element in communication with the vent when the replaceable valve member is in the operative position. The second valve element is arranged to open upon negative pressure applied to the spout by the person sucking on the spout, whereupon liquid within the cup flows through the first valve element and the spout, while the second valve element opens to enable air to enter into the sippy cup through the vent. The recess is located in a peripheral edge of the replaceable valve member. The recess is arranged to enable liquid from the interior of the cup to pass therethrough and through the first valve element and the spout to enable the entire liquid contents of the sippy cup to be withdrawn therefrom by the person sucking on the spout.

DESCRIPTION OF THE DRAWING

FIG. 3 is a front side elevation view of the lid shown in FIGS. 1 and 2 mounted on a cup to form a complete sippy cup assembly, including the replaceable valve member of this invention, with the valve member being located within the cup and thus not visible in this view;

FIG. 4 is an enlarged isometric view showing the upper side of the replaceable valve member shown in FIGS. 1 and 2;

FIG. 5 is an isometric view, similar to FIG. 4, but showing the underside of the replaceable valve member;

FIG. 6 is front elevation view of the replaceable valve member shown in FIGS. 4 and 5;

DETAILED DESCRIPTION OF THE PREFERRED EMBODIMENT

Figure 1:
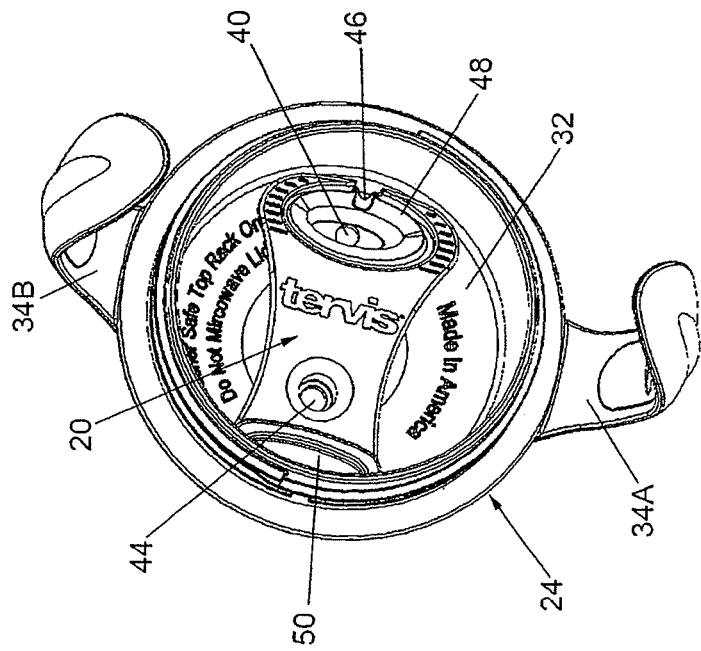
FIG. 1 is a is a isometric view of a lid for a sippy cup on which a replaceable valve member constructed in accordance with this invention is releasably mounted in a storage position, such as would be occasioned when the lid and replaceable valve member are washed in a dishwasher.

Referring now to the various figures of the drawing wherein like reference characters refer to like parts, there is shown at 20 in FIG. 1 one exemplary embodiment of replaceable valve member constructed in accordance with this invention. The valve member 20 is arranged to be used in a "sippy" drinking cup assembly for infants, toddlers or other persons having difficulty drinking from a conventional cup or glass. One exemplary sippy cup is shown in FIG. 3 and basically comprises a hollow base or cup 22 on which a lid 24 is releasably connected. The cup 22 is a hollow member arranged to hold a liquid. Although not shown, the cup 22 is preferably a double walled member including a hollow interior vessel disposed within a hollow exterior vessel. Both vessels may be blow molded of a thermoplastic material and joined together, e.g., ultrasonically welded, to provide an insulating air-space therebetween. The inner vessel is arranged to receive any type of liquid to maintain its temperature. It should be pointed out at this juncture that while the cup is preferably double walled, such a construction is not mandatory, e.g., the cup may be single walled. In any case, the upper end of the cup 22 includes a throat (not shown) having interior threads for mating engagement with exterior threads 26 of the lid 24 to releasably mount the lid onto the cup.

The lid 24 is best seen in FIG. 1 and is somewhat hollow member having a sidewall 28 and a top wall 30. The top wall 30 is of a dome-like shape and includes a concave inner surface 32 (FIG. 2) from which the sidewall 28 projects downward. The heretofore identified exterior threads 26 extend about the sidewall 28.

As is typical, the sippy cup lid 24 includes a pair of handles 34A and 34B. The handles are arcuate members which project outward from the dome-like top portion of the lid on diametric sides thereof to enable the infant or toddler or any other person using the sippy cup to hold the sippy cup to drink from it. To that end, the dome-like top of the lid 24 includes a hollow projecting portion which serves as a spout or nipple 36 onto which the infant/toddler can place his/her lips to suck the liquid from the interior of the sippy cup. The spout includes a top surface having plural apertures 38 that are in fluid communication with the hollow interior of the spout.

Figure 9:
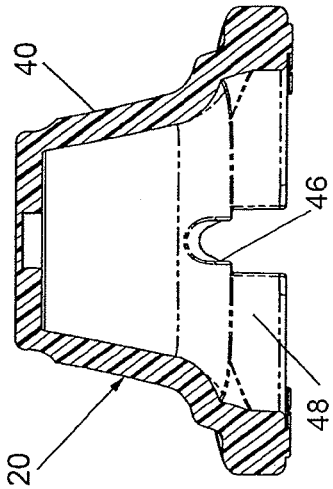
FIG. 9 is a sectional view taken along line 9-9 of FIG. 8.
Figure 7:
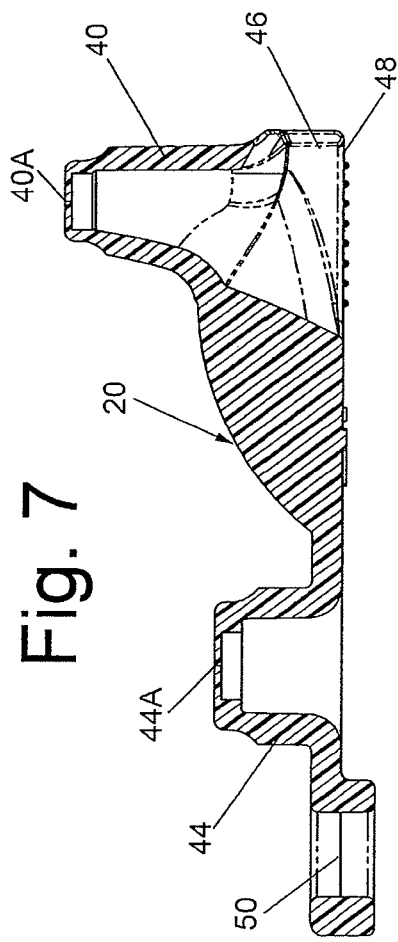
FIG. 7 is a sectional view taken along line 7-7 of FIG. 6.
Figure 8:
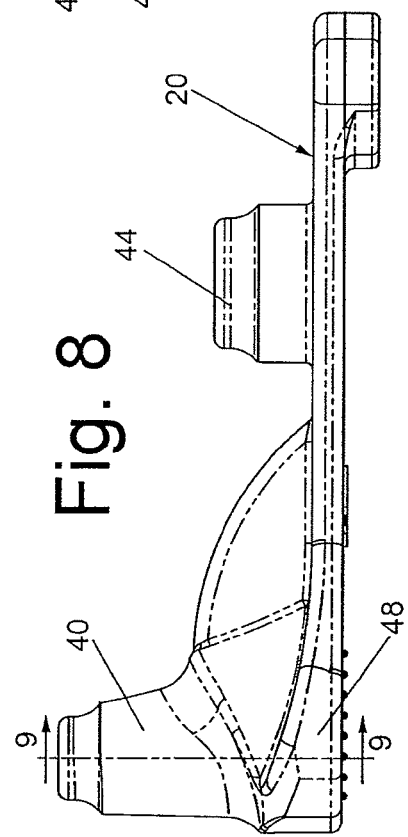
FIG. 8 is a side elevation view of the replaceable valve member shown in FIGS. 4 and 5.

The replaceable valve member 20 is best seen in FIGS. 3-10 and basically comprises a unitary member formed of a resilient and flexible material, e.g., a thermoplastic elastomer (TPE), such as sold under the trademark Dynaflex by GLS Thermoplastic Elastomers a division of PolyOne Corporation. The valve member is arranged to be releasably mounted in the hollow interior portion of the lid 24 in abutment with the lid's inner surface 34. As best seen in FIGS. 7 and 9 the replaceable valve 20 includes a first hollow projecting portion 40 which fits into and mates with the hollow interior of the lid's spout 36. The projecting portion 40 includes a top wall having a first valve element in the form of a slit 40A (FIGS. 4, 7 and 10) in that top wall. The elastomeric nature of the material making up the valve member 20 causes the slit 40A to be normally closed. Such action prevents leakage or spillage through the spout. The slit, however, can be readily opened by the application of suction to the spout by the user, which opening enables the liquid within the sippy cup to be drawn through the open slit when the user sucks on the spout.

In order to enable air to gain ingress into the sippy cup 22 to replace the liquid withdrawn, the lid 24 includes a vent opening or aperture 42 (FIG. 1) extending through the dome-like top wall 30 and in communication with the hollow interior of the lid. The replaceable valve member 20 includes a second, hollow projecting portion 44 which fits into and mates with a hollow recess (not shown) in the underside of the lid and is in fluid communication with the vent 42. The hollow projecting portion 44 includes a top wall having a second valve element in the form of a slit 44A (FIGS. 4, 7 and 10) in that top wall. The elastomeric nature of the material making up the valve member 20 causes the slit 44A to be normally closed to prevent air from gaining ingress into the sippy cup through the vent. The slit is, however, arranged to be opened by the application of suction when the user sucks on the nipple, whereupon air is drawn through the vent 42 and opened slit 44A into the interior of the sippy cup to replace the volume of liquid withdrawn.

Figure 2:
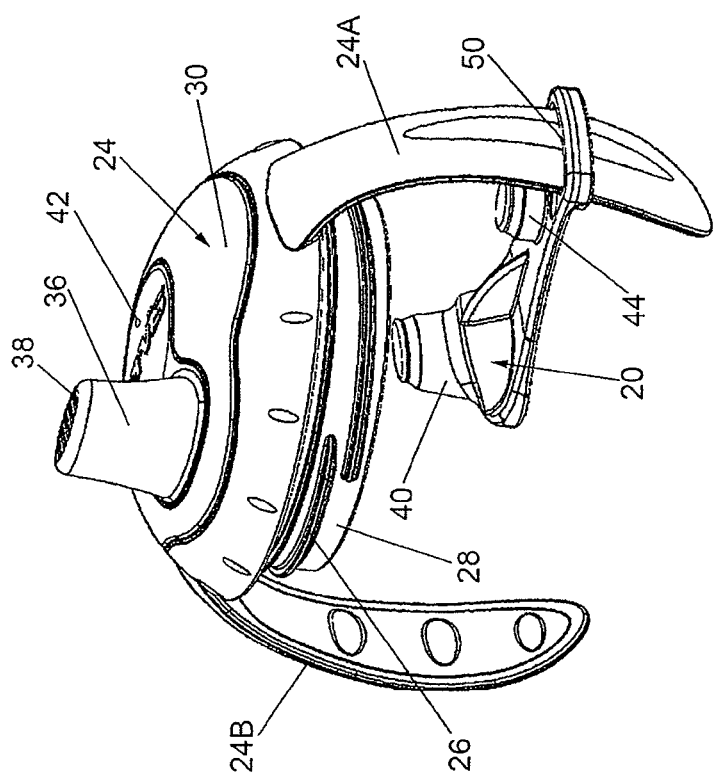
FIG. 2 is an isometric view of the underside of the sippy cup lid showing the replaceable valve member in place in its normal operating position to enable a person to drink out of a cup (not shown) connected to the lid without leakage or spillage.

The elastomeric nature of the replaceable valve member ensures that the two projecting portions 40 and 44 are frictionally held within the hollow interior of the spout 36 and the recess (not shown) in communication with the vent 42, respectively, thereby holding the valve member in place in what can be called its operative position. This position is shown in FIG. 2 and is the position in which the valve can perform its functions as described above.

As mentioned above prior art replaceable valves for sippy cups have suffered from the drawback of preventing effective drainage of all or virtually all of the liquid contents of the sippy cup by creating a dam behind which some residual liquid may be trapped if the sippy cup is totally inverted. The valve member 20 of the subject invention overcomes that disadvantage of the prior art. To that end, as can be seen in FIGS. 2, 4-7, 9 and 10 the valve member 20 includes a notch or recess 46 in a skirt portion 48 depending downward from the projection portion 40. The height of the recess is greater than the height of the skirt portion 48 and extends into a portion of the hollow projecting portion 40. Thus, when the valve member 20 is in place in its operative position in the lid, the skirt of the valve member and the rest of the periphery of the valve member immediately adjacent the inner surface 32 of the lid cannot form a dam to trap some residual liquid therein when the sippy cup is totally inverted. In this regard, any liquid which would attempt to accumulate in that area will instead flow through the recess 46 into the interior of the projecting portion 40 and thus out through the slit 40A when suction is applied to the spout 36.

Figure 10:
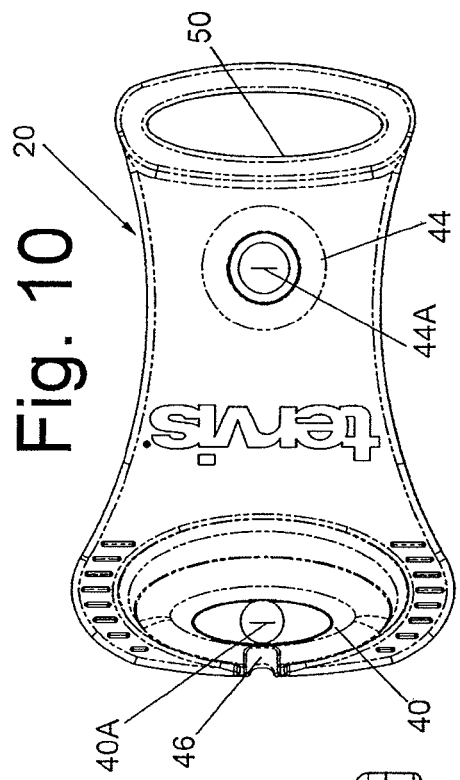
FIG. 10 is a top plan view of the replaceable valve member shown in FIGS. 4 and 5.

As best seen in FIG. 10, end portion of the valve member disposed opposite the recess 46 is in the form of an enlarged oval shaped opening 50. The opening 50 is of a size and shape to somewhat tightly accommodate and frictionally engage either of the handles 34A or 34B therein. This feature enables one to remove the valve member 20 from its normal operative position, like shown in FIG. 2, and which was described above, to releasably mount it on either handle in what can be called a storage or stowed position. One such stowed or storage position is shown in FIG. 1, wherein the valve member 20 is releasably mounted on the handle 34A at approximately the midpoint thereof and with the valve member pointing inward toward the center of the lid 24. The storage position shown in FIG. 1 is one of many storage positions that the valve may be placed in on either handle 34A or 34B. Irrespective of which handle the valve member is mounted on, the frictional engagement of the opening 50 of the valve member and the handle is such as to effectively hold the valve member in place on the handle, while exposing virtually all of the surfaces of the valve member. Thus, when the lid 24 with the valve member 20 mounted thereon in a storage position is placed in a dishwasher, the entire valve member can be washed and sanitized. And, being releasably attached to the handle, it is unlikely that the valve member will become lost or misplaced.

It should be pointed out at this juncture that the shape, configuration and material making up the valve member 20 as shown and described above is merely exemplary of various replaceable valve members that can be made in accordance with the teachings of this invention. Moreover, if desired, the valve member may include the recess to prevent the trapping of residual liquid in the sippy cup, without making use of the opening to releasably mount the valve member on the handle. Conversely, if desired, the valve member may include the opening to releasably mount the valve member on the handle, without making use of the recess to prevent the trapping of residual liquid in the sippy cup. It should also be noted that while the disclosed embodiment makes use of a pair of handles forming a portion of the lid, that arrangement is not exclusive. Thus, the lid may include only a single handle. In fact, the lid of the sippy cup assembly may not include any handle. Rather one or more handles can be a part of the cup itself. Thus, in such a case a valve member constructed in accordance with this invention would be arranged to be releasably mounted on a handle of the cup.

Without further elaboration the foregoing will so fully illustrate my invention that others may, by applying current or future knowledge, adopt the same for use under various conditions of service.

I claim:

1. A replaceable valve member for a sippy cup assembly having a cup for holding a liquid and a lid releasably secured to the cup, the lid including a hollow spout and an air vent, the sippy cup assembly also includes at least one handle for manually supporting the cup to enable a person to suck on the spout to withdraw the liquid from the cup through the spout, said replaceable valve member being a unitary member formed of a resilient flexible material and comprising:
    a) a first projection including a top portion, a downwardly projecting skirt portion and a hollow interior, said top portion including a first, normally closed but openable valve element in communication with said hollow interior, said skirt portion including a notch in communication with said hollow interior, said first projection being arranged to be releasably mounted within the spout when said replaceable valve member is in an operative position, said notch enabling liquid to flow therethrough into said hollow interior to prevent the trapping of residual liquid between said replaceable valve member and the lid when said replaceable valve member is in said operative position; and
    b) a second projection including a second, normally closed but openable valve element, said second projection being arranged to be releasably mounted in the lid with said second valve element in communication with the vent when said replaceable valve member is in said operative position, said second valve element being arranged to open upon negative pressure applied to the spout by the person sucking on the spout, whereupon liquid within the cup flows through said hollow interior, said first valve element and the spout thereby enabling the entire liquid contents of the sippy cup to be withdrawn therefrom by the person sucking on the spout, while said second valve element opens to enable air to enter into the sippy cup through the vent.

2. The replaceable valve member of claim 1 wherein said first valve element comprises a slit.

3. The replaceable valve member of claim 1 wherein said second valve element comprises a slit.

4. The replaceable valve member of claim 2 wherein said second valve element comprises a slit.

5. The replaceable valve member of claim 1 wherein said resilient flexible material comprises silicone rubber.

6. The replaceable valve member of claim 1 wherein said notch is located in a peripheral edge of said replaceable valve member.

7. The replaceable valve member of claim 1 additionally comprising:
    c) an opening configured to receive a portion of the at least one handle therein and to frictionally engage that portion of the handle to releasably secure said replaceable valve member on said handle when said replaceable valve member is removed from its operative position and placed in a storage position.

8. In combination a lid and a replaceable valve for a cup to form a sippy cup assembly, said lid comprising a hollow spout and an air vent, the sippy cup assembly also includes at least one handle for manually supporting the cup to enable a person to suck on the spout to withdraw the liquid from the cup through the spout, said replaceable valve member being a unitary member formed of a resilient flexible material and comprising:
    a) a first projection including a top portion, a downwardly projecting skirt portion and a hollow interior, said top portion including a first, normally closed but openable valve element in communication with said hollow interior, said skirt portion including a notch in communication with said hollow interior, said first projection being arranged to be releasably mounted within the spout when said replaceable valve member is in an operative position, said notch enabling liquid to flow therethrough into said hollow interior to prevent the trapping of residual liquid between said replaceable valve member and the lid when said replaceable valve member is in said operative position; and
    b) a second projection including a second, normally closed but openable valve element, said second projection being arranged to be releasably mounted in the lid with said second valve element in communication with the vent when said replaceable valve member is in said operative position, said second valve element being arranged to open upon negative pressure applied to the spout by the person sucking on the spout, whereupon liquid within the cup flows through said hollow interior, said first valve element and the spout thereby enabling the entire liquid contents of the sippy cup to be withdrawn therefrom by the person sucking on the spout, while said second valve element opens to enable air to enter into the sippy cup through the vent.

9. The combination of claim 8 wherein said first valve element comprises a slit.

10. The combination of claim 8 wherein said second valve element comprises a slit.

11. The combination of claim 9 wherein said second valve element comprises a slit.

12. The combination of claim 8 wherein said resilient flexible material comprises silicone rubber.

13. The combination of claim 8 wherein said notch is located in a peripheral edge of said replaceable valve member.

14. The combination of claim 8 additionally comprising:
   c) an opening configured to receive a portion of the at least one handle therein and to frictionally engage that portion of the handle to releasably secure said replaceable valve member on said handle when said replaceable valve member is removed from its operative position and placed in a storage position.

\* \* \* \* \*